Patented Oct. 5, 1937

2,094,596

UNITED STATES PATENT OFFICE 2,094,596

INDIGOID DYES AND A PROCESS FOR THE PREPARATION THEREOF

Emeric Havas, Pitman, N. J., assignor to E. I. du Pont de Nemours & Company, Wilmington, Del., a corporation of Delaware No Drawing. Application November 14, 1935, Serial No. 49,844

8 Claims. (Cl. 260—48)

This invention relates to new and improved dyes, more particularly new and improved indigoid dyes, and a process for the preparation thereof.

It is an object of the invention to provide a new class of indigoid compounds which are useful for the dyeing and printing of textile fibers, particularly cotton and regenerated cellulose. A further object is to produce new and improved dyes of desirable shades and good fastness properties. A still further object is the provision of a new and improved process for producing compounds of the type above described. Other objects will appear hereinafter.

These objects are accomplished in accordance with this invention by the preparation of new colors of the general formula:

(1) 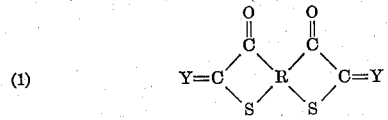

wherein R represents an aromatic nucleus, preferably of the benzene series, in which the two thiophene nuclei are attached to the same benzene nucleus, and Y represents an indigoid radical. These dyes are insoluble in water, generally show a relatively high order of solubility and ease of reduction to the leuco form, and are obtainable in a wide variety of shades depending upon the type of indigoid radical and the nature and position of auxochromic substituent groups. They may be dyed and printed on textile fabrics, as, for example, cotton and regenerated cellulose, by methods usually used for vat dyes and yield dyeings and printings of excellent shades and fastness properties.

These new and improved dyes may be prepared by the condensation of a bis-thioindoxyl having the formula:

(2) 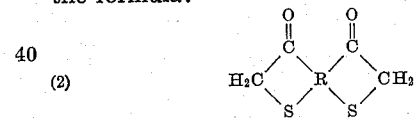

in which R has the foregoing significance, with a compound adapted to condense with simple thioindoxyls to form indigoid dyes, such as, for example, isatin, isatin derivatives, thioisatin derivatives, ortho-quinones such as acenaphthenequinone, and other intermediates forming indigoid dyes with thioindoxyls.

The bis-thioindoxyls of formula (2) and a process of preparing them are described and claimed in my co-pending U. S. application, Serial No. 49,843 filed of even date herewith. In general, they may be prepared by the ring-closure of the corresponding bis-thioglycollic acids, for example, by treatment of the thioglycollic acids with anhydrous aluminum chloride.

The invention is further illustrated but is not limited by the following examples, in which the quantities are stated in parts by weight.

Example I

Twenty-seven (27) parts of dibrom-isatin were transformed into the chloride by heating for one hour at 100°–110° C. with 20 parts of phosphorus pentachloride in 600 parts of chlorobenzene. This solution of dibrom-isatin-chloride was cooled to 20° C., 10 parts of benzene-meta-bis-thioindoxyl added, and the mass stirred at room temperature until condensation was complete. The precipitated color was filtered off, the cake stirred with water, the suspension made alkaline with sodium carbonate, and the adhering chlorobenzene removed by steam distillation. The color was purified by successively extracting it with warm dilute hydrochloric acid and dilute sodium hydroxide solutions. The product was washed until neutral, and used in dyeing or printing in the form of paste. It yields a yellow vat, from which cotton and regenerated cellulose are dyed to a dark blue shade of good fastness properties. The color has the probable constitution:

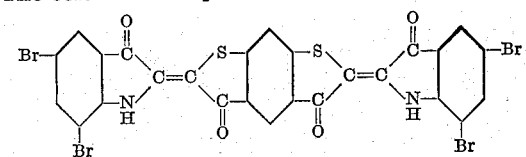

Example II

A mixture of 11 parts of meta-phenylene-bis-thioglycollic acid, 13 parts of phosphorus trichloride and 150 parts of chlorobenzene was heated for one hour at 85° C., then cooled to 20° C. Thirteen (13) parts of anhydrous aluminum chloride were added, the charge heated to 60° C. for one hour, and then cooled to 20° C.

A mixture of 24 parts of dibrom-isatin, 18 parts of phosphorus pentachloride and 300 parts of chlorobenzene was heated for one hour at 100°–110° C., then cooled to 20° C. The solutions were mixed and stirred at 30° C. until color formation was complete. The mass was diluted with water, made alkaline with soda ash, and the chlorobenzene removed by steam distillation. The color remaining in suspension was filtered off and purified as in Example I. The product was identical with that obtained in the preceding example.

Example III

The process of Example I was repeated, substituting the equivalent amount of isatin for dibrom-isatin. A bluish-black dye of similar properties was obtained. The color has the following constitution:

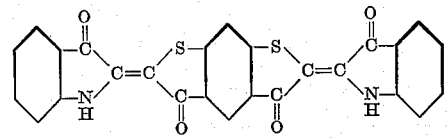

The process of Example II also may be used for the preparation of this color.

Example IV

Eleven (11) parts of meta-phenylene-bis-thioglycollic acid, 13 parts of phosphorus trichloride and 150 parts of chlorobenzene were heated for one hour at 85° C., then cooled to 20° C. Thirteen (13) parts of anhydrous aluminum chloride were added and the charge heated for one hour at 60° C. Twenty-four (24) parts of dibromisatin were then added, and the heating continued for one hour at 60° C. The reaction mass was cooled to 30° C., and the color separated by filtration. The adhering chlorobenzene was removed by steam distillation, and the remaining color washed with dilute sodium hydroxide solution and then with water.

The product was a dark brown powder which, upon reduction, gave a very light-colored vat. Cotton and regenerated cellulose are dyed from this vat to a reddish-brown shade. The dye has the probable formula:

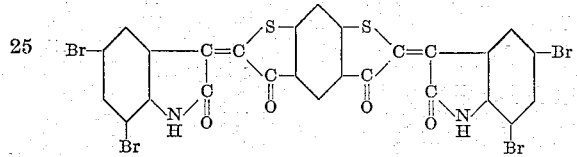

Example V

The process of Example II was repeated, substituting para-phenylene-bis-thioglycollic acid for the meta derivative. The dye yields clear blue shades of excellent fastness properties. The color has the probable constitution:

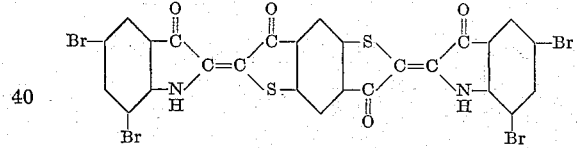

Example VI

Eleven (11) parts of meta-phenylene-bis-thioglycollic acid, 13 parts of phosphorus trichloride and 150 parts of chlorobenzene were heated for one hour at 85° C., then cooled to 30° C. Thirteen (13) parts of anhydrous aluminum chloride were added and the charge heated for one hour at 60° C. The reaction mass was added to a mixture of 150 parts of water, 65 parts of sodium hydroxide solution of 30% strength and 65 parts of sodium carbonate solution of 10% strength. The chlorobenzene was removed by steam distillation, and the residue diluted to 600 parts. Five (5) parts of sodium carbonate and 80 parts of acenaphthene-quinone paste (16% solids) were added. The mass was stirred at 90°–95° C. for two hours, at which time color formation was complete. The dye was isolated by filtration and washed with water. It was used in the form of a paste.

The new color yields a violet vat, from which cotton or regenerated cellulose are dyed to a bright scarlet shade. The finished color has the probable constitution:

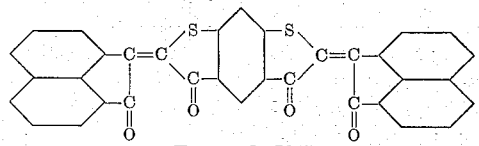

Example VII

Four and one-half (4.5) parts of benzene-meta-bis-thioindoxyl, 150 parts of glacial acetic acid and 13 parts of the dimethyl-amino-anilide of 6-ethoxy-thioindoxyl, of the formula:

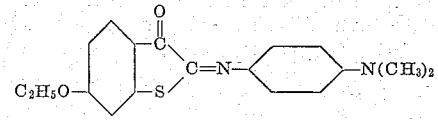

were heated under reflux for one hour. The mass was cooled, and the color separated by filtration. It was washed with water and converted to a paste. The dye yields a yellow vat, from which cotton and regenerated cellulose are dyed to brownish-orange shades of good fastness properties. The dye has the probable constitution:

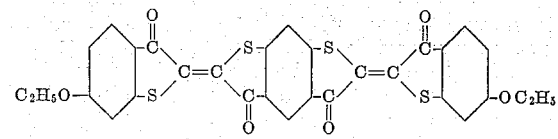

Similarly, dyes have been prepared from meta-phenylene-bis-thioindoxyl (Table I), para-phenylene-bis-thioindoxyl (Table II), and ortho-phenylene-bis-thioindoxyl (Table III), as follows:

Table I

Meta-phenylene-bis-thioindoxyl

| Example No. | Condensed with | Formula of color | Shade |
|---|---|---|---|
| VIII | Isatin | | Brown |
| IX | Para-dimethyl-amino-anilide of 4-methyl-6-chloro-thioindoxyl | | Violet |
| X | Para-dimethyl-amino-anilide of Beta-naphtho-thioindoxyl | | Brown |

TABLE II
Para-phenylene-bis-thioindoxyl

| Example No. | Condensed with | Formula of color | Shade |
|---|---|---|---|
| XI | Isatin-chloride | (structure) | Blue |
| XII | Isatin | (structure) | Red |
| XIII | Para - dimethyl - amino - anilide of 6 - ethoxy- thioindoxyl | (structure) | Red |

TABLE III
Ortho-phenylene-bis-thioindoxyl

| Example No. | Condensed with | Formula of color | Shade |
|---|---|---|---|
| XIV | Isatin chloride | (structure) | Blue |
| XV | Dibromo-isatin chloride | (structure) | Blue |
| XVI | Acenaphthene-quinone | (structure) | Pink |
| XVII | Para-dimethyl-amino-anilide of 6-ethoxy thioindoxyl | (structure) | Scarlet |
| XVIII | Para-dimethyl-amino-anilide of 4-methyl-6-chloro-thioindoxyl | (structure) | Red |

Obviously, the above examples are illustrative of a very large series of new indigoid and thioindigoid dyes obtained according to this invention. Ortho-, meta- and para-benzene-bis-thioindoxyls may be condensed with any of the numerous isatins and isatin derivatives. When isatin itself is used, condensation takes place with the so-called beta-carbonyl group. When the anilide, chloride or similar derivative is used, condensation takes place in the so-called alpha-position. Both of these possibilities are illustrated in the above examples. Obviously, the isatins may be substituted in the benzene nuclei by radicals such as halogen, alkyl and alkoxy. Monobromo- or monochloro-isatins or isatin derivatives may be substituted for the dibromo-isatin or isatin derivatives. If desired, all of the positions (four) containing replaceable hydrogens may be substituted.

The benzene-bis-thioindoxyls likewise may be condensed with derivatives of thioindoxyls such as the dimethyl-amino-anilide of 6-ethoxy-thio-indoxyl, as illustrated in Example VII. In this case, the finished colors may be described as "double thioindigos". The benzene nucleus of the thioindoxyl and/or bis-thioindoxyl may be substituted by radicals such as alkyl, alkoxy and halogen. Obviously, thioindoxyls and bis-thioindoxyls of the naphthalene and higher aromatic series also may be used. As many as four positions in the thioindoxyl nuclei and two positions in the bis-thioindoxyl nucleus may be substituted by auxochromic substituents such as, for example, alkyl, alkoxy and halogen.

Similarly, the benzene-bis-thioindoxyls may be condensed with other reagents to produce unsymmetrical indigoid colors. This is illustrated in Example VI, in which acenaphthene-quinone is used. The extensions of this idea will be obvious to one skilled in the art.

The methods of converting indoxyls to indigoid dyes are well known. With suitable modifications readily determined by one skilled in the art, these processes may be applied to the preparation of the "double indigoids" of the present application.

The examples disclose the application of these colors to cotton and regenerated cellulose by dyeing procedures. The various methods of dyeing indigoid vat colors may be used with the products of the present invention. Further, these products may be printed by the well known processes, the best results again being obtained on cotton and regenerated cellulose. In the dyeing and printing processes, suitable assistants and reducing agents are used.

The new colors may be prepared in the form of pastes, either of the aqueous or solvent type. These pastes may contain the usual assistants, penetrating agents, and other auxiliary chemicals. The colors also may be produced in the form of dry powders, which also may contain the auxiliary agents. Thus, in the preparation of dye pastes, such auxiliary agents as dextrine, ethanolamine salts, alkali metal salts of the condensation product of formaldehyde with sulfonated naphthalene, alkali metal anthraquinone sulfonates and carboxylates, glycerin, sugars, diethylene glycol, metal salts (e. g., iron salts), and other compounds which aid in dyeing and printing, may be employed, either separately or together. In the preparation of powders, the use of dextrine and the sodium salt of a sulfonated naphthalene-formaldehyde condensation product is desirable. In preparing printing pastes, the usual thickeners, alkalis (NaOH, Na₂CO₃, etc.), and reducing agents (sodium formaldehyde sulfoxylate, glucose, etc.) may be used.

Throughout the specification and claims, the term "alkyl" is intended to include and cover aliphatic hydrocarbon radicals, as, for example, methyl, ethyl, isopropyl, butyl, and higher homologues; the term "alkoxy" is intended to cover methoxy, ethoxy, butyloxy and higher homologues. The term "indigoid" is used herein generically as used, for example, by Truttwin "Enzyklopädie der Kupenfarbstoffe", and includes dyes containing the grouping:

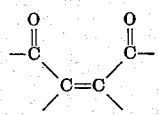

The dyes of the present invention contain this grouping twice and are therefore "double indigoid" dyes. By an "indigoid radical" is meant any radical

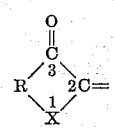

wherein R is an aromatic nucleus, and X represents NH, O, S or Se, or any other radical (as, for example, an acenaphthequinone radical) which, when attached to the carbon atom in the 2-position of said radical, gives the structure of an indigoid dye. Where X is S in the above radical, the radical is referred to as a thionaphthene radical; where X is NH, the radical is referred to as an indole radical. These terms are intended to cover substituted or unsubstituted radicals.

The colors of the present invention may be used for the dyeing and printing of textile fibers, particularly cotton and regenerated cellulose, to desirable shades and good fastness properties. Many of these colors are unusual in shade, and show a relatively high order of solubility and ease of reduction to the leuco form, both of technical advantage in the textile art.

As many apparently widely different embodiments of this invention may be made without departing from the spirit and scope thereof, it is to be understood that I do not limit myself to the specific embodiments thereof, except as defined in the appended claims.

I claim:

1. An indigoid dye having the formula:

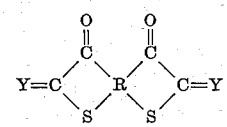

in which R represents a benzene nucleus of an aromatic radical, and Y represents a thionaphthene radical.

2. An indigoid dye having the formula:

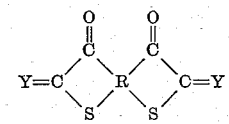

in which R represents a benzene nucleus of an aromatic radical, and Y represents an indole radical of the general formula

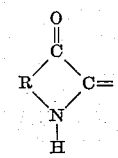

wherein R is an aromatic nucleus.

3. An indigoid dye having the formula:

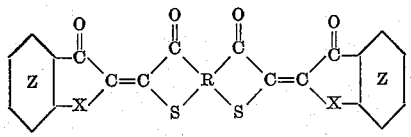

in which R represents a benzene nucleus of an aromatic radical, X represents NH or S, and Z represents a phenyl nucleus substituted by at least one member of the group consisting of alkyl, alkoxy and halogen.

4. An indigoid dye having the formula:

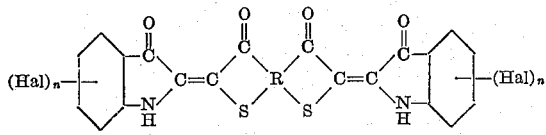

wherein R represents a benzene nucleus of an aromatic radical, Hal represents halogen and $n$ represents an integer not exceeding the number of replaceable hydrogens.

5. An indigoid dye having the formula:

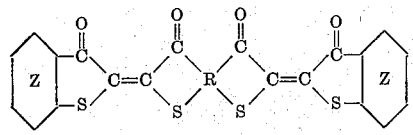

wherein R represents a benzene nucleus of an aromatic radical, and Z represents a phenyl nucleus substituted by at least one member of the group consisting of alkyl, alkoxy and halogen.

6. An indigoid dye having the formula:

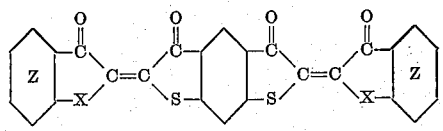

in which X represents NH or S, and Z represents a phenyl nucleus substituted by at least one member of the group consisting of alkyl, alkoxy and halogen.

7. A dye having the following formula:

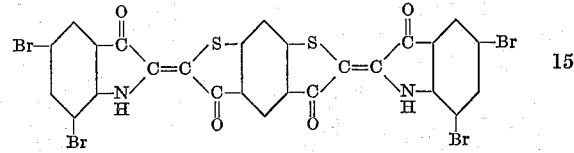

which yields a yellow vat from which cotton and regenerated cellulose are dyed a dark blue shade of good fastness.

8. A dye having the following formula:

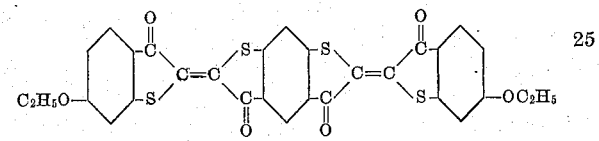

which yields a yellow vat from which cotton and regenerated cellulose are dyed brownish-orange shades of good fastness.

EMERIC HAVAS.